US012802845B2

(12) United States Patent
Imamura et al.

(10) Patent No.: US 12,802,845 B2
(45) Date of Patent: Nov. 17, 2026

(54) METHOD OF PRODUCING GRAIN-ORIENTED ELECTRICAL STEEL SHEET

(71) Applicant: JFE STEEL CORPORATION, Tokyo (JP)

(72) Inventors: Takeshi Imamura, Tokyo (JP); Yukihiro Shingaki, Tokyo (JP); Masanori Takenaka, Tokyo (JP); Takashi Terashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 462 days.

(21) Appl. No.: 18/561,412

(22) PCT Filed: May 27, 2022

(86) PCT No.: PCT/JP2022/021835
§ 371 (c)(1),
(2) Date: Nov. 16, 2023

(87) PCT Pub. No.: WO2022/250162
PCT Pub. Date: Dec. 1, 2022

(65) Prior Publication Data
US 2024/0249863 A1 Jul. 25, 2024

(30) Foreign Application Priority Data
May 28, 2021 (JP) ................................ 2021-090686

(51) Int. Cl.
*C22C 38/34* (2006.01)
*C21D 1/74* (2006.01)
(Continued)

(52) U.S. Cl.
CPC ........... *H01F 1/14791* (2013.01); *C21D 1/74* (2013.01); *C21D 6/001* (2013.01); *C21D 6/002* (2013.01);
(Continued)

(58) Field of Classification Search
CPC ....... C22C 38/02; C22C 38/08; C21D 8/1283; C21D 201/052
See application file for complete search history.

(56) References Cited

U.S. PATENT DOCUMENTS 3,932,234 A 1/1976 Imanaka et al.
5,885,371 A 3/1999 Komatsubara et al.
(Continued)

FOREIGN PATENT DOCUMENTS

CN 1188970 A 7/1998
CN 1190132 A 8/1998
(Continued)

OTHER PUBLICATIONS

JP2013139629A English language translation (Year: 2013).*
(Continued)

*Primary Examiner* — Sally A Merkling
*Assistant Examiner* — Sean P. O'Keefe
(74) *Attorney, Agent, or Firm* — KENJA IP LAW PC

(57) ABSTRACT

To provide a grain-oriented electrical steel sheet with good processing accuracy in rounding while maintaining excellent magnetic properties, and a producing method thereof. Disclosed is the method including: subjecting a steel material to heating to 1300 °C or higher and hot rolling, subjecting the resulting sheet directly, or after subjection to hot-rolled sheet annealing, to at least two cycles of cold rolling with intermediate annealing therebetween, decarburization annealing, application of an annealing separator to a surface of the sheet, final annealing, in which maximum
(Continued)

arrival temperatures in the first and second cycles of the cold rolling satisfy a predetermined relation, total rolling reductions in the first and second cycles of the cold rolling satisfy a predetermined relation, and in the final annealing, an average heating rates in temperature ranges from 50 °C to 1000 °C and from 1000 °C to (maximum arrival temperature—50 °C) satisfy a predetermined relation.

16 Claims, 5 Drawing Sheets

(51) Int. Cl.

| | |
|---|---|
| ***C21D 6/00*** | (2006.01) |
| ***C21D 8/1216*** | (2026.01) |
| ***C21D 8/1244*** | (2026.01) |
| ***C21D 8/1277*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/10*** | (2006.01) |
| ***C22C 38/12*** | (2006.01) |
| ***C22C 38/14*** | (2006.01) |
| ***C22C 38/16*** | (2006.01) |
| ***C22C 38/20*** | (2006.01) |
| ***C22C 38/24*** | (2006.01) |
| ***C22C 38/26*** | (2006.01) |
| ***C22C 38/28*** | (2006.01) |
| ***C22C 38/60*** | (2006.01) |
| ***H01F 1/147*** | (2006.01) |

(52) U.S. Cl.

CPC ............. *C21D 6/005* (2013.01); *C21D 6/007* (2013.01); *C21D 6/008* (2013.01); *C21D 8/1222* (2013.01); *C21D 8/1233* (2013.01); *C21D 8/1255* (2013.01); *C21D 8/1261* (2013.01); *C21D 8/1266* (2013.01); *C21D 8/1283* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/20* (2013.01); *C22C 38/24* (2013.01); *C22C 38/26* (2013.01); *C22C 38/28* (2013.01); *C22C 38/34* (2013.01); *C22C 38/60* (2013.01); *C21D 2201/05* (2013.01); *C22C 2202/02* (2013.01)

(56) References Cited

U.S. PATENT DOCUMENTS

| | | | | |
|---|---|---|---|---|
| 6,039,818 | A | 3/2000 | Toge et al. | |
| 6,322,639 | B1 * | 11/2001 | Matsuzaki ........... | C21D 8/1222 148/306 |
| 2013/0292006 | A1 * | 11/2013 | Takahashi ............ | C21D 8/1283 148/307 |
| 2019/0017139 | A1 * | 1/2019 | Omura ................. | C21D 8/1222 |
| 2020/0035392 | A1 * | 1/2020 | Omura .................. | C22C 38/002 |
| 2021/0027922 | A1 | 1/2021 | Yasuda et al. | |
| 2022/0090240 | A1 | 3/2022 | Takatani et al. | |

FOREIGN PATENT DOCUMENTS

| | | | | |
|---|---|---|---|---|
| JP | S4015644 | B | | 7/1965 |
| JP | S5113469 | B2 | | 4/1976 |
| JP | H08277421 | A | | 10/1996 |
| JP | 2000129356 | A | | 5/2000 |
| JP | 2001049351 | A | | 2/2001 |
| JP | 2006274405 | A | | 10/2006 |
| JP | 2007262436 | A | | 10/2007 |
| JP | 2008156693 | A | | 7/2008 |
| JP | 4320794 | B2 | * | 8/2009 |
| JP | 2013139629 | A | | 7/2013 |
| JP | 2020105589 | A | * | 7/2020 |
| WO | 2019146694 | A1 | | 8/2019 |
| WO | 2020149347 | A1 | | 7/2020 |

OTHER PUBLICATIONS

Aug. 21, 2025, Office Action issued by the China National Intellectual Property Administration in the corresponding Chinese Patent Application No. 202280038074.7 with English language search report.

Aug. 9, 2022, International Search Report issued in the International Patent Application No. PCT/JP2022/021835.

* cited by examiner

METHOD OF PRODUCING GRAIN-ORIENTED ELECTRICAL STEEL SHEET

TECHNICAL FIELD

This disclosure relates to a method of producing a grain-oriented electrical steel sheet suitably used for iron core materials of small transformers that undergo rounding.

BACKGROUND

Electrical steel sheets are widely used as iron cores in transformers, motors, and other components. Electrical steel sheets are broadly classified into grain-oriented electrical steel sheets and non-oriented electrical steel sheets. Grain-oriented electrical steel sheets are characterized by having a texture in which the <001> orientation, which is an easy magnetization axis of iron, is highly aligned with the rolling direction of the steel sheets. Such a texture is formed by causing secondary recrystallization in final annealing. The secondary recrystallization refers to a phenomenon in which crystal grains in the {110}<001> orientation, so-called Goss orientation, are preferentially grown into giant grains by using grain boundary energy. A typical technique for producing such secondary recrystallization is to use a precipitate called inhibitor. For example, a method using AlN and MnS described in JP S40-15644 B (PTL 1) and a method using MnS and MnSe described in JP S51-13469 B (PTL 2) are known and industrially put to use. These methods using inhibitors are useful for stable development of secondary recrystallized grains. In these methods, for the purpose of fine particle distribution of the inhibitors into the steel, it is necessary to perform slab heating at high temperatures of 1300 °C or higher to cause solid dissolution of the inhibitor components once.

On the other hand, for a material containing no inhibitor components, a technique for developing crystal grains with Goss orientation through secondary recrystallization is described in, for example, JP 2000-129356 A (PTL 3). This technique eliminates impurities such as inhibitor components as much as possible and elicits the dependency of grain boundary energy of primary recrystallized grains on the grain boundary misorientation angle, thus causing the secondary recrystallization of grains with Goss orientation without using inhibitors. This effect is called the texture inhibition effect. This method does not require fine particle distribution of the inhibitor in the steel and has manufacturing advantages over the methods using inhibitors, such as not requiring high-temperature slab heating, which was mandatory.

One example of applications of electrical steel sheets is to round them into cylindrical shapes as illustrated in FIG. 1, and then gradually change the rounding diameter and stack them in the radial direction to make an iron core. In the iron core manufactured in this way, the direction of excitation is one direction, up and down in FIG. 1. Accordingly, the use of grain-oriented electrical steel sheets can be expected to provide superior characteristics compared to the use of non-oriented electrical steel sheets.

CITATION LIST

Patent Literature

PTL 1: JP S40-15644 B
PTL 2: JP S51-13469 B
PTL 3: JP 2000-129356 A

SUMMARY

Technical Problem

However, it was newly discovered that bending of grain-oriented electrical steel sheets may cause problems with processing accuracy. For example, as illustrated in FIG. 2, the following problems frequently arise: two sides A and B of the steel sheet edges to be butted together are not parallel to each other, and the positions of the corners a and b of the steel sheet are shifted. If the processing accuracy of a grain-oriented electrical steel sheet is poor, it becomes difficult to form a stack of steel sheets properly, and the iron core cannot be constructed.

It would thus be helpful to provide a grain-oriented electrical steel sheet with good processing accuracy in rounding while maintaining excellent magnetic properties, and a method of producing the same.

Solution to Problem

The present inventors have studied the conditions for secondary recrystallization to address the above issues, and have succeeded in improving the processing accuracy after rounding by making the secondary recrystallized grains finer.

The present disclosure has been successfully achieved starting from experiments to be described below.

<Experiment 1>

Steel slabs with a chemical composition consisting of C: 0.075%, Si: 3.41%, Mn: 0.12%, Se: 0.020%, Al: 0.024%, and N: 0.0082%, with the balance being Fe and inevitable impurities, were each reheated at a temperature of 1400 °C, and then hot rolled to obtain hot-rolled sheets of 2.4 mm in thickness. Each steel sheet was subjected to pickling to remove scale, followed by hot-rolled sheet annealing at 1050 °C for 10 seconds. Subsequently, cold rolling was performed to a thickness of 1.7 mm, where the sheet temperature was controlled by changing the rolling speed and coolant flow rate, and the maximum temperature during cold rolling was changed in various ways. In addition, intermediate annealing was performed at 1050 °C for 100 seconds. Subsequently, the second cycle of cold rolling was performed to finish each steel sheet to a thickness of 0.23 mm. At this point, the sheet temperature was controlled by changing the rolling speed and coolant flow rate, and the maximum temperature during rolling was changed in various ways. In addition, each steel sheet was subjected to decarburization annealing at 820 °C for 120 seconds, with 55% $H_2$+45% $N_2$ and a dew point of 65 °C. Then, an annealing separator containing 90 mass % or more of MgO was applied to the steel sheet surface, and then each steel sheet was subjected to final annealing in which it was held at 1200 °C for κ hours. The atmosphere during the final annealing was an $N_2$ atmosphere up to 900 °C during heating, an $H_2$ atmosphere during the period in which the temperature was raised from 900 °C to 1230 °C, held at 1230 °C, and lowered down to 1000 °C after the end of holding, and an Ar atmosphere during the subsequent cooling. During the heating process in the final annealing, the average heating rate in the temperature range from 50 °C to 1000 °C was set at 20 °C/h, the average heating rate in the temperature range from 1000 °C to 1150 °C was set at 15 °C/h, and the average heating rate in the temperature range from 1150 °C to 1200 °C was set at 10 °C/h.

For each obtained steel sheet, magnetic flux density $B_8$ (magnetic flux density at a magnetizing force of 800 A/m)

was measured by the method prescribed in JIS C2550-1 (2011). A 60-mm-square-sample was cut from each obtained steel sheet and rounded using a twin roller processing machine having an iron roller of 20 mm in diameter and a urethane roll of 300 mm in diameter. The direction of rounding was orthogonal to the rolling direction (i.e., the sheet transverse direction). In other words, each sample was rounded to form a circular arc in the direction orthogonal to the rolling direction. The processing accuracy of each rounded sample was evaluated using the two parameters H and θ illustrated in FIG. 3. As seen from FIG. 3, H denotes the distance between the corners a and b of each sample to be butted together, and θ denotes the angle between the two butted sides A and B. Under these conditions, when the ideal shape is obtained, the respective parameters are such that H is 2.0 mm and θ is 0°. The more the parameters deviate from these values, the worse the processing accuracy. If the parameters are within the range of 1.8 mm to 3.0 mm for H and 0° to 2.5° for θ, respectively, the sample is considered acceptable. As an evaluation of processing accuracy in rounding, a sample for which both parameters were within the acceptable bounds was scored as "O," a sample for which only one of the parameters was within the acceptable bounds was scored as "Δ," and a sample for which both parameters were out of the acceptable bounds was scored as "x". Even if both parameters were within the acceptable bounds, if secondary recrystallization defects occurred and the magnetic flux density $B_8$ was less than 1.900 T, that sample was scored as "x". FIG. 4 illustrates the relationship between the maximum arrival temperatures T1 and T2 in the first and second cycles of cold rolling. As seen from FIG. 4, it was revealed that the rounding shape and magnetic flux density were both good if the maximum arrival temperatures T1 and T2 in the first and second cycles of cold rolling were within specific ranges, specifically, if they satisfied the relations of 0≤T1≤150, 50≤T2≤400, and T1≤T2.

<Experiment 2>

Steel slabs with a chemical composition consisting of C: 0.055%, Si: 3.20%, Mn: 0.05%, S: 0.012%, Al: 0.032%, and N: 0.0065%, with the balance being Fe and inevitable impurities were each reheated at a temperature of 1400 °C, and then subjected to hot rolling to obtain hot-rolled sheets having various thicknesses from 0.6 mm to 3.5 mm. Then, the hot-rolled sheets were subjected to pickling to remove scale, followed by hot-rolled sheet annealing at 1000 °C for 30 seconds. Subsequently, the steel sheets were subjected to the first cycle of cold rolling to various thicknesses from 0.35 mm to 2.2 mm. At this point, the sheet temperature was controlled at 70 °C by changing the rolling speed and coolant flow rate. Then, the steel sheets were subjected to intermediate annealing at 1050 °C for 150 seconds, and then subjected to the second cycle of cold rolling to a thickness of 0.23 mm. At this point, the sheet temperature was controlled at 220 °C by changing the rolling speed and coolant flow rate. In addition, each steel sheet was subjected to decarburization annealing at 850 °C for 120 seconds, with 55% $H_2$+45% $N_2$ and a dew point of 63 °C. Then, an annealing separator containing 90 mass % or more of MgO was applied to the steel sheet surface, and then each steel sheet was subjected to final annealing in which it was held at 1200 °C for 5 hours in an $H_2$ atmosphere. During the heating process in the final annealing, the average heating rate in the temperature range from 50 °C to 1000 °C was set at 25 °C/h, the average heating rate in the temperature range from 1000 °C to 1150 °C was set at 16 °C/h, and the average heating rate in the temperature range from 1150 °C to 1200 °C was set at 10 °C/h.

For each obtained steel sheet, magnetic flux density $B_8$ (magnetic flux density at a magnetizing force of 800 A/m) was measured by the method prescribed in JIS C2550-1 (2011). A 60-mm-square-sample was cut from each obtained steel sheet and rounded using a twin roller processing machine having an iron roller of 20 mm in diameter and a urethane roll of 300 mm in diameter. The direction of rounding was orthogonal to the rolling direction (i.e., the sheet transverse direction). In other words, each sample was rounded to form a circular arc in the direction orthogonal to the rolling direction. The processing accuracy of each rounded sample was evaluated using the two parameters H and θ illustrated in FIG. 3. As seen from FIG. 3, H denotes the distance between the corners a and b of each sample to be butted together, and θ denotes the angle between the two butted sides A and B. Under these conditions, when the ideal shape is obtained, the respective parameters are such that H is 2.0 mm and θ is 0°. The more the parameters deviate from these values, the worse the processing accuracy. If the parameters are within the range of 1.8 mm to 3.0 mm for H and 0° to 2.5° for θ, respectively, the sample is considered acceptable. As an evaluation of processing accuracy in rounding, a sample for which both parameters were within the acceptable bounds was scored as "O," a sample for which only one of the parameters was within the acceptable bounds was scored as "Δ," and a sample for which both parameters were out of the acceptable bounds was scored as "x". Even if both parameters were within the acceptable bounds, if secondary recrystallization defects occurred and the magnetic flux density $B_8$ was less than 1.900 T, that sample was scored as "x". FIG. 5 illustrates the relationship between the total rolling reduction in the first cycle of cold rolling and the total rolling reduction in the second cycle of cold rolling. As seen from FIG. 5, it was revealed that the rounding shape and magnetic flux density were both good when the total rolling reduction in the first cycle of cold rolling, denoted by R1, was 50% or less and the total rolling reduction in the second cycle of cold rolling, denoted by R2, was 50% or more.

<Experiment 3>

Steel slabs with a chemical composition consisting of C: 0.065%, Si: 2.87%, Mn: 0.25%, S: 0.012%, Se: 0.022%, Al: 0.016%, and N: 0.0051%, with the balance being Fe and inevitable impurities, were each reheated at a temperature of 1410 °C, and then hot rolled to obtain hot-rolled sheets of 2.3 mm in thickness. Then, the hot-rolled sheets were subjected to pickling to remove scale, and then subjected to the first cycle of cold rolling to a thickness of 1.5 mm. At this point, the sheet temperature was controlled at 50 °C by changing the rolling speed and coolant flow rate. Then, the steel sheets were subjected to intermediate annealing at 1025 °C for 80 seconds, and then subjected to the second cycle of cold rolling to a thickness of 0.23 mm. At this point, the sheet temperature was controlled at 300 °C by changing the rolling speed and coolant flow rate. In addition, each steel sheet was subjected to decarburization annealing at 840 °C for 80 seconds, with 50% $H_2$+50% $N_2$ and a dew point of 60 °C. Then, an annealing separator containing 90 mass % or more of MgO was applied to the steel sheet surface, and then each steel sheet was subjected to final annealing in which it was held at 1200 °C for 10 hours in an $H_2$ atmosphere. During the heating process in the final annealing, the average heating rate in the temperature range from 50 °C to 1000 °C, denoted by H1, and the average heating rate in the temperature range from 1000 °C to 1150 °C, denoted by H2, were changed in various ways. In the temperature range from 1150 °C to 1200 °C. (maximum arrival temperature), the average heating rate was set at 5 °C/h.

For each obtained steel sheet, magnetic flux density $B_8$ (magnetic flux density at a magnetizing force of 800 A/m) was measured by the method prescribed in JIS C2550-1 (2011). A 60-mm-square-sample was cut from each obtained steel sheet and rounded using a twin roller processing machine having an iron roller of 20 mm in diameter and a urethane roll of 300 mm in diameter. The direction of rounding was orthogonal to the rolling direction (i.e., the sheet transverse direction). In other words, each sample was rounded to form a circular arc in the direction orthogonal to the rolling direction. The processing accuracy of each rounded sample was evaluated in the same way as in Experiment 1 described above. FIG. 6 illustrates the relationship between the evaluation results and the average heating rates H1 and H2 in the final annealing. As seen from FIG. 6, it was revealed that the rounding shape was good when the average heating rate H1 from 50 °C to 1000 °C was at least 1.1 times higher than the average heating rate H2 from 1000 °C to 1150 °C and in the range of 5 °C/h to 40 °C/h.

Although the reason for the good rounding shape under the above conditions is not clear, the present inventors consider as follows.

In the above experiments, those steel sheets in the conditions of superior processing accuracy in rounding and others in the conditions of inferior processing accuracy were immersed in a hot hydrochloric acid at 90 °C for 120 seconds at a concentration of 5% to remove the base film, exposing secondary recrystallized grains. The size of secondary recrystallized grains was then compared. As a result, it was revealed that the average grain size of secondary recrystallized grains was about 5.5 mm for the steel sheets in the conditions of superior processing accuracy, which was clearly smaller than that of about 11.5 mm for the others in the conditions of inferior processing accuracy. This means that under the conditions of superior processing accuracy, there were more grain boundaries of secondary recrystallized grains.

Here, rounding is a type of plastic working and is considered to be crystal orientation dependent. In other words, when rounding is applied in one direction, the degree of processing may vary slightly from grain to grain because of slight misorientation in each crystal grain. This difference in the degree of processing is thought to be absorbed by the grain boundaries, which allow for some strain accumulation. In other words, if there are few grain boundaries, the grain boundaries cannot absorb the difference in the degree of processing between crystal grains, resulting in distortion of the steel sheet and inferior processing accuracy. In contrast, if there are many grain boundaries, the difference can be absorbed and the processing accuracy is expected to be good. There are two major methods for reducing the size of secondary grains and increasing grain boundaries. One is to increase the number of crystal grains that are the source of secondary recrystallization, i.e., those with Goss orientation, before performing final annealing, and the other is to control the final annealing conditions so that secondary recrystallization occurs simultaneously and from all locations in final annealing. Considering this in the context of the above experiments, controlling the maximum arrival temperatures in the two cold rolling cycles and the reduction ratio in each cold rolling cycle to a predetermined range corresponds to the former, while specifying the average heating rate during the final annealing corresponds to the latter.

In this respect, the present inventors newly found that by properly controlling the maximum arrival temperatures in the first and second cycles of cold rolling and the reduction ratio in each cycle of cold rolling, and by properly controlling the average heating rate during the final annealing, the secondary recrystallized grains can be effectively refined and the processing accuracy of rounding can be improved. The present disclosure is based on these discoveries.

Specifically, primary features of the present disclosure are as follows. [1] A method of producing a grain-oriented electrical steel sheet, the method comprising: heating a steel material to a temperature of 1300 °C or higher, the steel material having a chemical composition containing (consisting of), by mass %, C: 0.010% or more and 0.100% or less, Si: 2.00% or more and 5.00% or less, Mn: 0.01% or more and 0.50% or less, Al: 0.010% or more and 0.040% or less, N: 0.0030% or more and 0.0120% or less, and one or both of S and Se: 0.005% or more and 0.100% or less in total, with the balance being Fe and inevitable impurities; then subjecting the steel material to hot rolling to obtain a hot-rolled sheet; then subjecting the hot-rolled sheet directly, or after subjection to hot-rolled sheet annealing, to at least two cycles of cold rolling with intermediate annealing in between to obtain a cold-rolled sheet; then subjecting the cold-rolled sheet to decarburization annealing to obtain a decarburization-annealed sheet; then applying an annealing separator to a surface of the decarburization-annealed sheet; and then subjecting the decarburization-annealed sheet to final annealing to obtain a grain-oriented electrical steel sheet, wherein a maximum arrival temperature (°C) in the first cycle of the cold rolling, denoted by T1, and a maximum arrival temperature (°C) in the second cycle of the cold rolling, denoted by T2, satisfy the following formulas (1) to (3), a total rolling reduction (%) in the first cycle of the cold rolling, denoted by R1, and a total rolling reduction (%) in the second cycle of the cold rolling, denoted by R2, satisfy the following formula (4), and in the final annealing, an average heating rate (°C/h) in a temperature range from 50 °C to 1000 °C, denoted by H1, and an average heating rate (°C/h) in a temperature range from 1000 °C to (maximum arrival temperature—50 °C), denoted by H2, satisfy the following formulas (5) and (6):

$$0 \le T1 \le 150 \tag{1}$$

$$50 \le T2 \le 400 \tag{2}$$

$$T1 \le T2 \tag{3}$$

$$R2 \ge 50 \ge R1 \tag{4}$$

$$H1 \ge 1.1 \times H2 \tag{5}$$

$$5 \le H1 \le 40. \tag{6}$$

[2] The method of producing a grain-oriented electrical steel sheet according to aspect [1], wherein the hot rolling includes heating the steel material and then subjecting the steel material to at least one pass of rough rolling at 1100 °C or higher and 1300 °C or lower, followed by at least two passes of finishing rolling at 800 °C or higher and 1100 °C or lower, with a coiling temperature of 400 °C or higher and 750 °C or lower, the hot-rolled sheet annealing includes holding the hot-rolled sheet at 800 °C or higher and 1250 °C or lower for at least 5 seconds, and then cooling the hot-rolled sheet at an average cooling rate of 5 °C/s or higher and 100 °C/s or lower in a temperature range from 800 °C to 350 °C, the intermediate annealing includes holding the cold-rolled sheet after subjection to the first cycle of the cold rolling at 800 °C or higher and 1250 °C or lower for at least 5 seconds, and then cooling the cold-rolled sheet at an average cooling rate of 5 °C/s or higher and 50 °C/s or lower in a temperature range from 800 °C to 350 °C, the decarburization annealing includes holding the cold-rolled sheet at 750 °C to 950 °C for at least 10 seconds in an atmosphere that contains $H_2$ and $N_2$ and that is in a wet atmosphere with a dew point of 20 °C or higher and 80 °C or lower at least partially during the decarburization annealing, before the final annealing, the annealing separator that contains MgO is applied to the surface of the decarburization-annealed sheet at a weight of at least 2.5 g/m$^2$ per surface, and the final annealing includes holding the decarburization-annealed sheet at 1050 °C or higher and 1300 °C or lower for at least 3 hours under conditions where an atmosphere in at least part of a temperature range of 1050 °C or higher contains $H_2$.

[3] The method of producing a grain-oriented electrical steel sheet according to aspect [1] or [2], wherein the chemical composition further contains, by mass % or mass ppm, at least one selected from the group consisting of Ni: 0% or more and 1.50% or less, Cr: 0% or more and 0.50% or less, Cu: 0% or more and 0.50% or less, P: 0% or more and 0.50% or less, Sb: 0% or more and 0.50% or less, Sn: 0% or more and 0.50% or less, Bi: 0% or more and 0.50% or less, Mo: 0% or more and 0.50% or less, B: 0 ppm or more and 25 ppm or less, Nb: 0% or more and 0.020% or less, V: 0% or more and 0.010% or less, and Zr: 0% or more and 0.10% or less.

[4] The method of producing a grain-oriented electrical steel sheet according to any of aspects [1] to [3], wherein the chemical composition further contains, by mass %, one or both of Co: 0% or more and 0.050% or less and Pb: 0% or more and 0.0100% or less.

[5] The method of producing a grain-oriented electrical steel sheet according to any of aspects [1] to [4], wherein the chemical composition further contains, by mass %, at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less.

Advantageous Effect

The present disclosure provides a grain-oriented electrical steel sheet with good processing accuracy in rounding while maintaining iron loss properties, and a method of producing the same.

DETAILED DESCRIPTION

Figure 1:
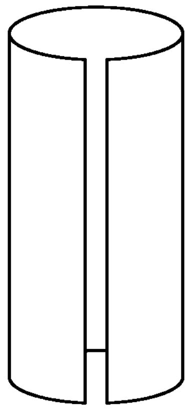
FIG. 1 illustrates an ideal shape after rounding.
Figure 2:
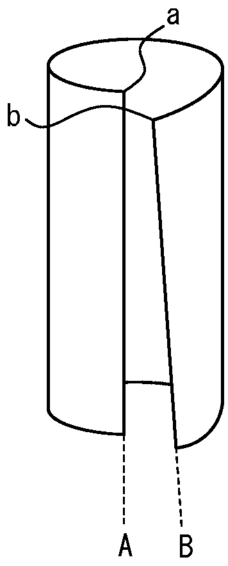
FIG. 2 illustrates a shape after rounding with poor processing accuracy.

The present disclosure will be described in detail below.

<Steel Material>

First of all, although the chemical composition of the steel material (steel slab) of the grain-oriented electrical steel sheet is not particularly limited in the present disclosure, the following describes desirable ranges of the chemical composition. The indications of "%" and "ppm" regarding components are "mass %" and "mass ppm," respectively, unless otherwise noted.

C: 0.010% or More and 0.100% or Less

If the C content exceeds 0.100%, it becomes difficult to reduce the C content to or below 0.005%, where magnetic aging does not occur after decarburization annealing. Therefore, the C content is 0.100% or less. On the other hand, if the C content is less than 0.010%, the grain boundary strengthening effect of C is lost, which may cause cracking in the slab and other defects that interfere with operability. Therefore, the C content is 0.010% or more and 0.100% or less. The C content is preferably 0.025% or more, and more preferably 0.035% or more. The C content is preferably 0.085% or less, and more preferably 0.060% or less.

Si: 2.00% or More and 5.00% or Less

Si is an element necessary to increase the specific resistance of steel and reduce iron loss, but a Si content below 2.00% is ineffective. On the other hand, if the content exceeds 5.00%, the workability of the steel deteriorates and rolling becomes difficult. Therefore, the Si content is 2.00% or more and 5.00% or less. The Si content is preferably 2.90% or more, and more preferably 3.10% or more. The Si content is preferably 3.70% or less, and more preferably 3.55% or less.

Mn: 0.01% or More and 0.50% or Less

Mn is an element necessary to obtain good hot workability, but a Mn content below 0.01% is ineffective. On the other hand, if the content exceeds 0.50%, the magnetic flux density of the product sheet decreases. Therefore, the Mn content is 0.01% or more and 0.50% or less. The Mn content is preferably 0.03% or more, and more preferably 0.06% or more. The Mn content is preferably 0.25% or less, and more preferably 0.15% or less.

Al: 0.010% or More and 0.040% or Less, N: 0.0030% or More and 0.0120% or Less

Al and N form AlN, which is an inhibitor. However, an Al content below 0.010% or a N content below 0.0030% does not fully demonstrate the effect. On the other hand, if the Al content exceeds 0.040% or the N content exceeds 0.0120%, sufficient solid dissolution cannot be achieved by slab heating, and fine particle distribution into the steel will not be achieved, resulting in significant degradation of magnetic properties. Therefore, the Al content is 0.010% or more and 0.040% or less and the N content is 0.0030% or more and 0.0120% or less. The Al content is preferably 0.013% or more, and more preferably 0.017% or more. The Al content is preferably 0.033% or less, and more preferably 0.029% or less. The N content is preferably 0.0039% or more, and more preferably 0.0050% or more. The N content is preferably 0.0113% or less, and more preferably 0.0100% or less.

One or both of S and Se: 0.005% or more and 0.100% or less in total S and Se combine with Mn to form MnS and MnSe, which are inhibitors. However, a total content of S and Se below 0.005% does not fully demonstrate the effect. On the other hand, if the total content exceeds 0.100%, sufficient solid dissolution cannot be achieved by slab heating, and fine particle distribution into the steel will not be achieved, resulting in significant degradation of magnetic properties. Therefore, the total content of one or both of S and Se is 0.005% or more and 0.100% or less. The total content is preferably 0.010% or more, and more preferably 0.020% or more. The total content is preferably 0.055% or less, and more preferably 0.040% or less.

While the basic components of the present disclosure have been described, the steel material disclosed herein may further contain the following elements as appropriate.

For the purpose of improving magnetic properties, at least one selected from the group consisting of the following can be added alone or in combination: Ni: 0% or more and 1.50% or less, Cr: 0% or more and 0.50% or less, Cu: 0% or more and 0.50% or less, P: 0% or more and 0.50% or less, Sb: 0% or more and 0.50% or less, Sn: 0% or more and 0.50% or less, Bi: 0% or more and 0.50% or less, Mo: 0% or more and 0.50% or less, B: 0 ppm or more and 25 ppm or less, Nb: 0% or more and 0.020% or less, V: 0% or more and 0.010% or less, and Zr: 0% or more and 0.10% or less. When the added amount of each element is less than the corresponding lower limit, the effect of improving magnetic properties is poor, and when it exceeds the corresponding upper limit, the development of secondary recrystallized grains is suppressed and magnetic properties deteriorate. From the viewpoint of improving magnetic properties, in terms of preferred lower limits, it is preferable to add at least one selected from the group consisting of Ni: 0.01% or more, Sb: 0.005% or more, Sn: 0.005% or more, Cu: 0.01% or more, Cr: 0.01% or more, P: 0.005% or more, Mo: 0.005% or more, Nb: 0.001% or more, V: 0.001% or more, B: 0.0002% or more, Bi: 0.005% or more, and Zr: 0.001% or more.

One or both of Co: 0% or more and 0.050% or less and Pb: 0% or more and 0.0100% or less may be added for the purpose of reducing the angle between two butted sides A and B among the indicators of rounding workability. Below the aforementioned lower limits, the angle reducing effect will not be obtained, and above the aforementioned upper limits, magnetic properties may deteriorate. In terms of preferred lower limits, it is preferable to add one or both of Co in an amount of 0.002% or more and Pb in an amount of 0.0001% or more.

To improve magnetic properties and to reduce the angle between two butted sides A and B among the indicators of rounding workability, it is possible to add at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less. Below the lower limits, the effect will not be obtained, and above the upper limits, magnetic properties may deteriorate. In terms of preferred lower limits, it is preferable to add at least one selected from the group consisting of As: 0.0010% or more, Zn: 0.001% or more, W: 0.0010% or more, Ge: 0.0001% or more, and Ga: 0.0001% or more.

<Production Process>

Steel material with the above components may be produced as a slab by the usual ingot casting or continuous casting, or as a thin slab or thinner cast steel with a thickness of 100 mm or less by direct casting. Although the slab or thin slab or thinner cast steel as the steel material is reheated in a usual manner and then hot rolled, it may be subjected to hot rolling just after casting without heating. In the case of the chemical composition using an inhibitor, the above reheating temperature is desirably 1300 °C or higher to cause solid dissolution of the inhibitor components.

After the reheating, it is preferable from the perspective of microstructural control of a hot-rolled sheet to perform at least one pass of rough rolling at 900 °C or higher and 1200 °C or lower, followed by at least two passes of finish rolling at 700 °C or higher and 1000 °C or lower. In addition, from the view point of both microstructural control of carbide and preventing defects such as cracking, the coiling temperature in the hot rolling is preferably set to 400 °C or higher. From the same viewpoint, the coiling temperature in the hot rolling is preferably set to 750 °C or lower. The coiling temperature is more preferably 500 °C or higher. The coiling temperature is more preferably 700 °C or lower. The temperature conditions and coiling temperature in the hot rolling are based on the surface temperature of the steel sheet immediately before coiling.

After the hot rolling, hot-rolled sheet annealing may be performed if necessary. When hot-rolled sheet annealing is performed, the microstructure can be homogenized and the variation in magnetic properties can be reduced. From the viewpoint of this microstructural homogenization, the hot-rolled sheet annealing conditions preferably include holding the sheet in the temperature range from 800 °C to 1250 °C for at least 5 seconds. The holding temperature is more preferably 900 °C or higher. The holding temperature is more preferably 1150 °C or lower. In this holding temperature range, the holding time is preferably 10 seconds or more. In this holding temperature range, the holding time is preferably 180 seconds or less. In terms of morphological control of the secondary phase and precipitates, cooling after the holding is performed with an average cooling rate of preferably 5 °C/s or higher in the temperature range from 800 °C to 350 °C. The average cooling rate in this temperature range is preferably 100 °C/s or lower. It is more preferably 15 °C/s or higher. It is more preferably 45 °C/s or lower.

Then, it is preferable to remove the scale on the steel sheet surface formed during the hot rolling. To this end, known methods may be followed, such as using heated acid or mechanically removing scale. After the scale removal, at least two cycles of cold rolling are performed with intermediate annealing in between, to obtain a final sheet thickness, and then decarburization annealing is performed.

In this cold rolling, as seen from the results of Experiments 1 and 2 above, it is important to satisfy the following conditions:

- a maximum arrival temperature (°C) in the first cycle of the cold rolling, denoted by T1, and a maximum arrival temperature (°C) in the second cycle of the cold rolling, denoted by T2, satisfy the relations of $0 \leq T1 \leq 150$, $50 \leq T2 \leq 400$, and $T1 \leq T2$, and
- a total rolling reduction (%) in the first cycle of cold rolling, denoted by R1, and a total rolling reduction (%) in the second cycle of cold rolling, denoted by R2, satisfy the relation of $R2 \geq 50 \geq R1$.

Preferably, the maximum arrival temperatures T1 and T2 satisfy the relations of 20 °C≤T1≤120 °C and 100 °C≤T2≤250 °C, respectively. Similarly, the total rolling reductions R1 and R2 satisfy the relations of 20%≤R1≤35% and 60%≤R2≤92%, respectively.

The maximum arrival temperatures T1 and T2 in the cold rolling may be controlled by, for example, using the heat generated by the rolling process, heating before rolling, or cooling with coolant or lubricant. The temperature conditions and average cooling rate during the cold rolling and intermediate annealing are based on the surface temperature of the steel sheet.

The intermediate annealing in the cold rolling preferably includes holding in the temperature range from 800 °C and 1250 °C for at least 5 seconds. That is, if the holding temperature is below 900 °C, recrystallized grains become finer and the amount of Goss nuclei in the primary recrystallization microstructure decreases, which may deteriorate the magnetic properties. On the other hand, if the holding temperature exceeds 1250 °C, rapid growth and decomposition of inhibitors may occur, resulting in degradation of magnetic properties. In cooling after the temperature holding, in terms of morphological control of the second phase and precipitates, the average cooling rate in the temperature range from 800 °C to 350 °C is preferably 5 °C/s or higher. The average cooling rate in this temperature range is preferably 100 °C/s or lower. It is more preferably 15 °C/s or higher. It is more preferably 45 °C/s or lower. Before the intermediate annealing, the steel sheet is preferably degreased to remove the rolling oil originating from the previous step. After the intermediate annealing, it is preferable to remove scale from the steel sheet surface. For the scale removal, known methods may be followed, such as using heated acid or mechanically removing scale.

After the final cold rolling, the cold-rolled steel sheet is subjected to decarburization annealing. Before that, however, it is preferable to clean the steel sheet surface by degreasing, pickling, or other process. In the decarburization annealing, it is preferable that the cold-rolled steel sheet be held in the temperature range from 750 °C to 950 °C for at least 10 seconds, that the atmospheric gas contain $H_2$ and $N_2$, and that the decarburization annealing is performed partially or entirely in a wet atmosphere with a dew point of 20 °C or higher and 80 °C or lower. The holding temperature is more preferably 800 °C or higher. The holding temperature is more preferably 900 °C or lower. In this temperature range, the dew point is more preferably 40 °C or higher. In this temperature range, the dew point is more preferably 70 °C or lower. The temperature conditions in the decarburization annealing are based on the surface temperature of the steel sheet.

It is preferable to perform the first half of holding in the decarburization annealing under a wet atmosphere in the temperature range and dew point conditions described above, and the second half of holding in the decarburization annealing under a dry atmosphere in the temperature range from 800 °C and 900 °C with a dew point of −50 °C or higher and 30 °C or lower. The reason is that this setup causes reduction of sub-scale on the outermost surface layer, which is advantageous for formation of a forsterite film in the final annealing.

Then, an annealing separator is applied to the front and back surfaces of the decarburization-annealed sheet before performing final annealing. The annealing separator may be a known annealing separator. In particular, it is preferable that an annealing separator that is mainly composed of MgO be applied to the surfaces of the decarburization-annealed sheet at a weight of at least 2.5 $g/m^2$ per surface. As used herein, the phrase "mainly composed of MgO" means that the MgO content in the annealing separator is 60% or more in terms of solid content. The content of MgO in the annealing separator is preferably 80% or more in terms of solid content. The method of applying the annealing separator to the surface of the decarburization-annealed sheet is not limited, and any known methods may be followed. For example, the annealing separator may be applied to the surface of the decarburization-annealed sheet in slurry form, or in dry form by electrostatic coating. During application of the annealing separator in slurry form, the annealing separator in slurry form is preferably held at a constant temperature to prevent viscosity increase. The constant temperature is preferably 5 °C or higher. The constant temperature is preferably 30 °C or lower. In order to maintain a constant concentration of the slurry, the annealing separator in slurry form is preferably separated into two tanks, one for preparation and the other for application.

Subsequently, final annealing can be performed to develop secondary recrystallized grains and form a forsterite film. Then, coils are annealed in an upended state because the final annealing takes a long time. It is preferable to wrap a band or other means around the coil before subjection to the final annealing to prevent the outer winding of the upended coil from unraveling.

In the final annealing, as apparent from the results of Experiment 3 described above, it is important that an average heating rate (°C/h) in a temperature range from 50 °C to 1000 °C, denoted by H1, and an average heating rate (°C/h) in a temperature range from 1000 °C to (maximum arrival temperature—50 °C), denoted by H2, satisfy the relations of $H1 \geq 1.1 \times H2$ and $5 \leq H1 \leq 40$. Preferably, the following relations are satisfied: $H1 \geq 1.2 \times H2$ and $10 \leq H1 \leq 30$.

The temperature conditions and average heating rate in the final annealing are based on the temperature of the steel sheet at the position in the middle of the innermost and outermost layers of the upended steel sheet coil on the surface where the upended steel sheet coil touches the annealing furnace floor.

Also, in order to purify inhibitor-forming elements and the like from the steel and obtain good iron loss properties, it is preferable that the steel sheet be held at a temperature range from 1100 °C to 1300 °C for at least 3 hours, and an atmosphere containing $H_2$ be introduced partially or entirely within the temperature range of 1000 °C or higher. The maximum arrival temperature in the final annealing is preferably 1150 °C or higher. It is preferably 1300 °C or lower. After the final annealing, washing, brushing, or pickling is useful to remove the attached annealing separator. It is effective to further perform flattening annealing to adjust the shape, for iron loss reduction.

Since electrical steel sheets are often stacked on top of one another when used, it is effective to apply an insulating coating to the steel sheet surface to ensure insulation. The coating is preferably a coating that can add tension to the steel sheet to reduce iron loss. As the coating, a coating solution may be applied prior to flattening annealing and baked in the flattening annealing. It is also preferable to apply a tension coating applying method with a binder, or a method that allows inorganic materials to be deposited as a coating on the surface layer of the steel sheet through physical vapor deposition or chemical vapor deposition, because it may provide excellent coating adhesion and significant iron loss reduction effects.

Example 1

Steel slabs with a chemical composition consisting of C: 0.030%, Si: 3.66%, Mn: 0.07%, S: 0.005%, Se: 0.013%, Al: 0.016%, and N: 0.0055%, with the balance being Fe and inevitable impurities were each reheated at a temperature of 1430 °C, and then subjected to hot rolling including six passes of rough rolling from 1200 °C and nine passes of finish rolling from 1100 °C, to thereby obtain hot-rolled sheets having various thicknesses from 0.85 mm to 2.70 mm. The coiling temperature was set at 575 °C. Then, the hot-rolled sheets were subjected to pickling to remove scale, followed by hot-rolled sheet annealing at 1000 °C for 100 seconds. The average cooling rate in the temperature range from 800 °C to 350 °C in the hot-rolled sheet annealing was set at 45 °C/s. Subsequently, the steel sheets were subjected to the first cycle of cold rolling to various thicknesses from 0.45 mm to 1.90 mm. The rolling reduction R1 in this first cycle of cold rolling is listed in Table 1. The sheet temperature was controlled by changing the rolling speed and coolant flow rate, and the maximum arrival temperature T1 was changed in various ways as listed in Table 1. In addition, the steel sheets were subjected to intermediate annealing at 1050 °C for 100 seconds. The average cooling rate in the temperature range from 800 °C to 350 °C in the intermediate annealing was set at 25 °C/s. Subsequently, the second cycle of cold rolling was performed to finish each steel sheet to a thickness of 0.23 mm. The rolling reduction R2 in this case is listed in Table 1. The sheet temperature was controlled by changing the rolling speed and coolant flow rate, and the maximum arrival temperature T2 was changed in various ways as listed in Table 1.

Then, each cold-rolled sheet was subjected to decarburization annealing at 820 °C for 120 seconds, with 55% $H_2$+45% $N_2$ and a dew point of 65 °C. Then, an annealing separator containing 90 mass % or more of MgO was applied to the steel sheet surface, and then each steel sheet was subjected to final annealing in which it was held at 1200 °C for 5 hours. The atmosphere during the final annealing was an $N_2$ atmosphere up to 900 °C during heating, an $H_2$ atmosphere during the period in which the temperature was raised from 900 °C to 1200 °C, held at 1200 °C, and lowered down to 1000 °C after the end of holding, and an Ar atmosphere during the subsequent cooling. During the heating process in the final annealing, the average heating rate H1 in the temperature range from 50 °C to 1000 °C and the average heating rate H2 in the temperature range from 1000 °C to 1150 °C were changed in various ways as listed in Table 1, while the average heating rate in the temperature range from 1150 °C to 1200 °C was set at 10 °C/h.

The magnetic flux density $B_8$ of each grain-oriented electrical steel sheet thus obtained was evaluated in accordance with JIS C2550-1 (2011). The results are listed in Table 1. A magnetic flux density of 1.900 T or higher was considered to have excellent magnetic properties.

Figure 3:
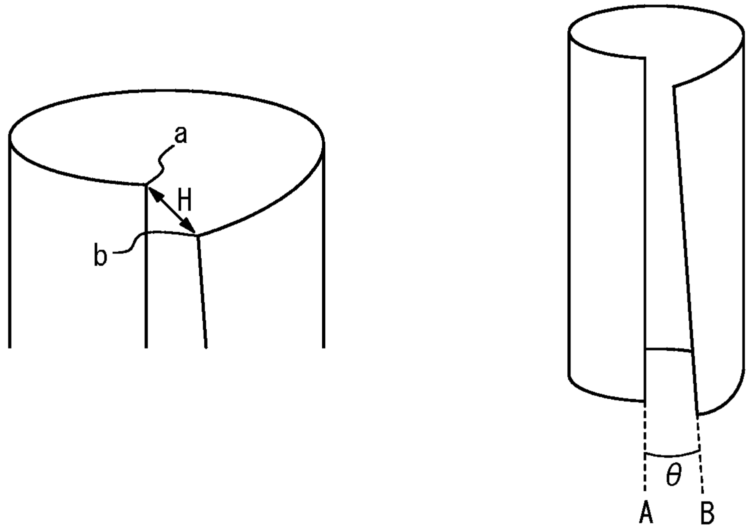
FIG. 3 illustrates the parameters indicative of processing accuracy of rounding.
Figure 4:
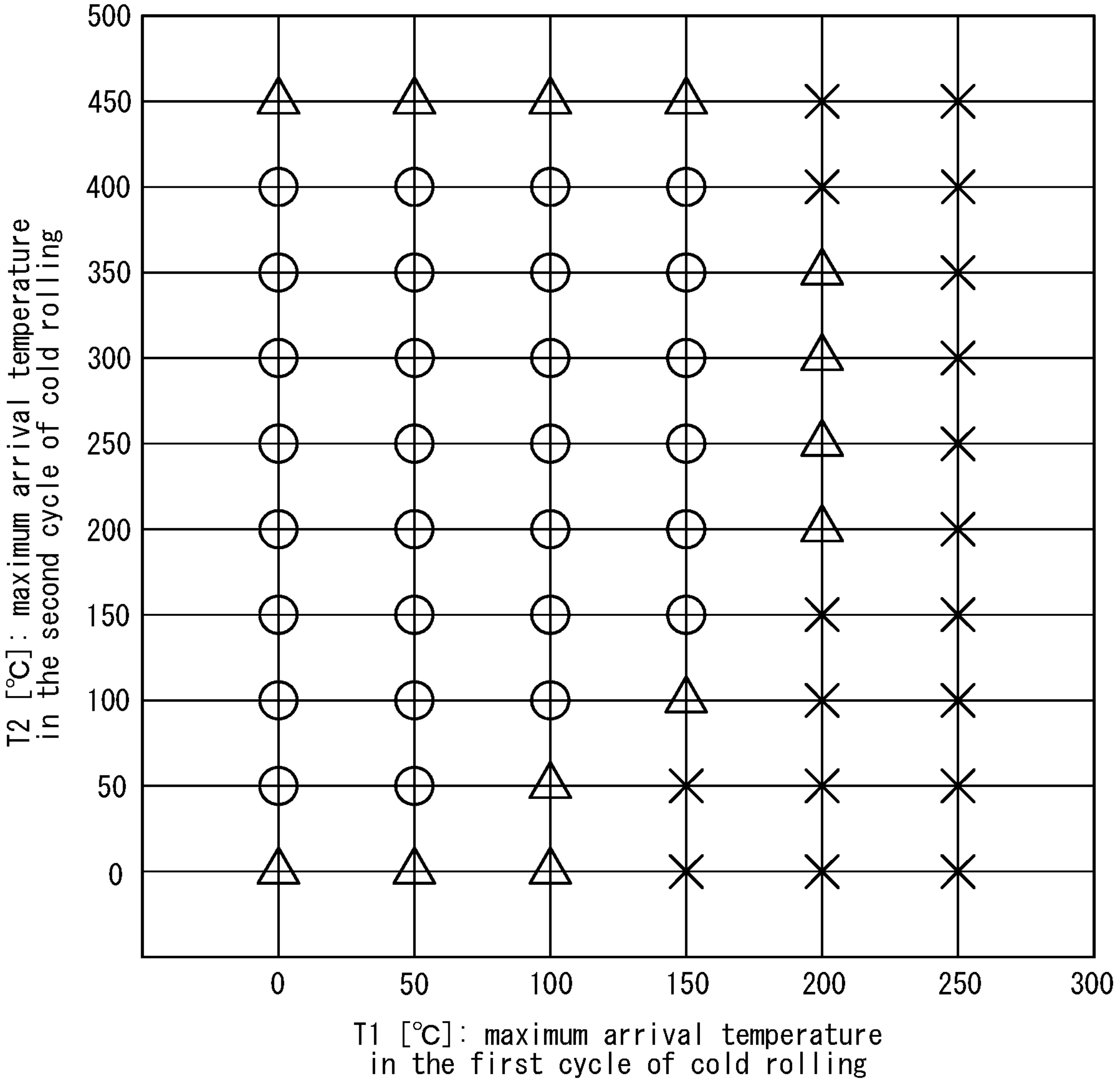
FIG. 4 illustrates the relationship between the maximum arrival temperature during cold rolling and the processing accuracy of rounding.
Figure 5:
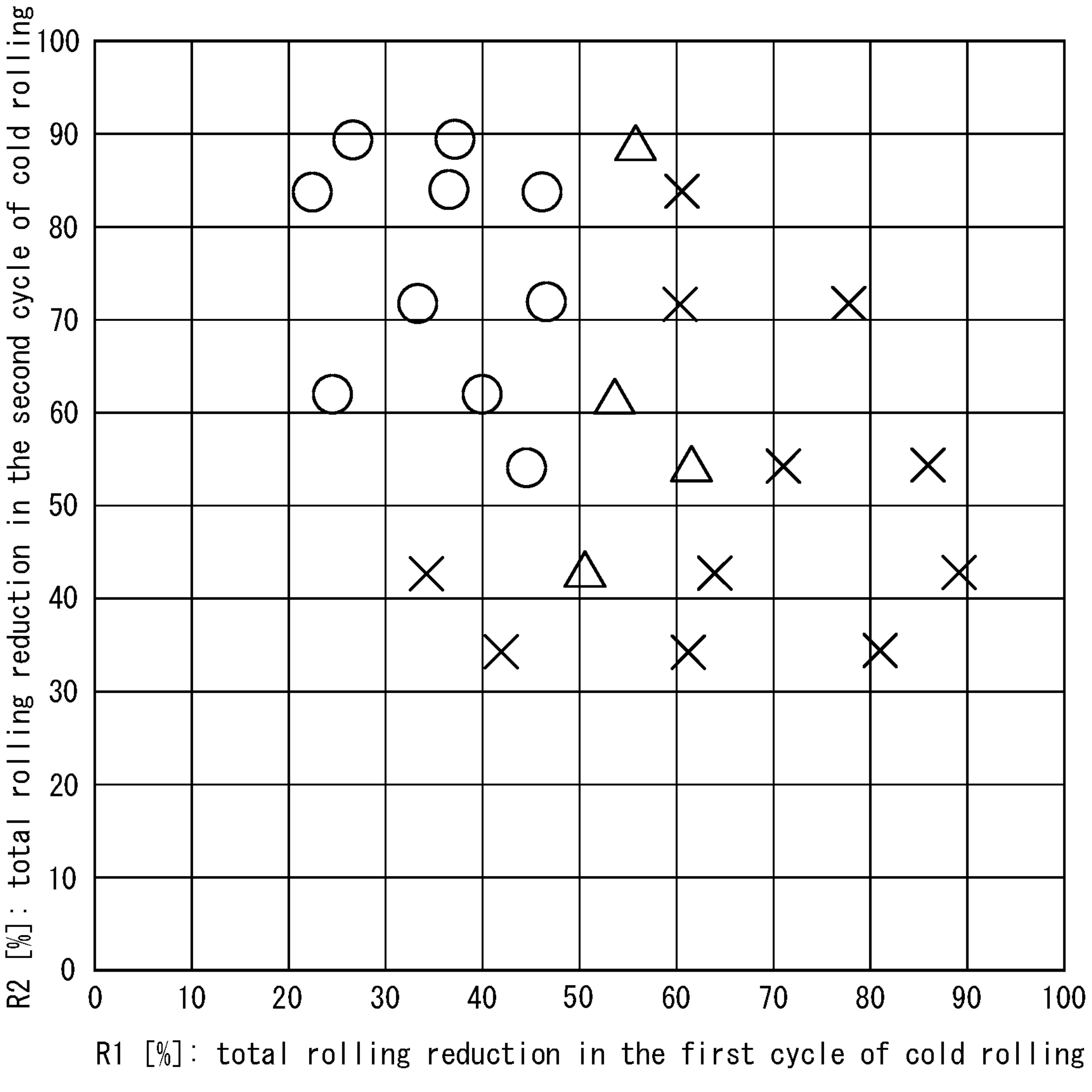
FIG. 5 illustrates the relationship between the total rolling reduction in cold rolling and the processing accuracy of rounding.
Figure 6:
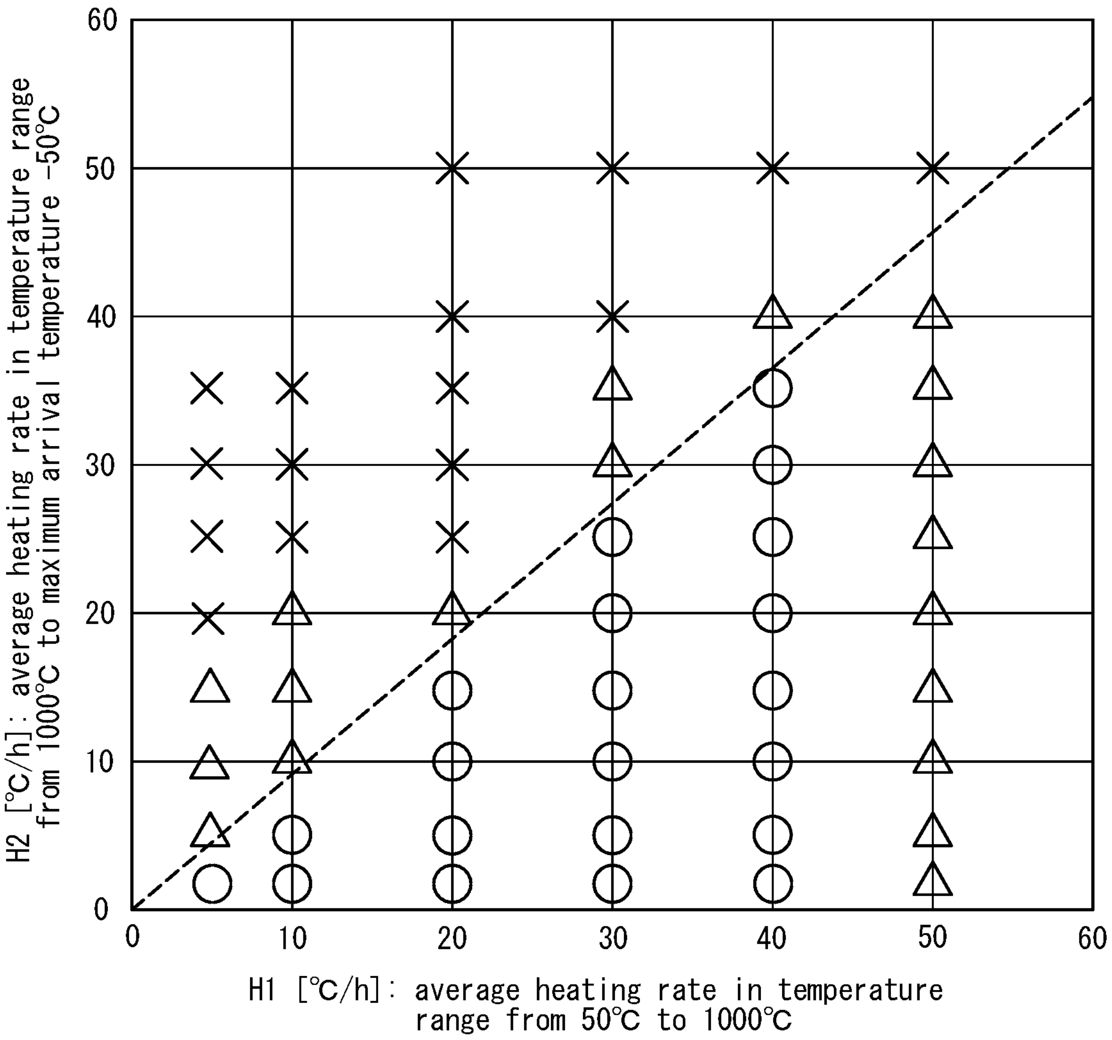
FIG. 6 illustrates the relationship between the average heating rate during final annealing and the processing accuracy of rounding.

A 60-mm-square-sample was cut from each obtained steel sheet and rounded using a twin roller processing machine having an iron roller of 20 mm in diameter and a urethane roll of 300 mm in diameter. The direction of rounding was orthogonal to the rolling direction (i.e., the sheet transverse direction). In other words, each sample was rounded to form a circular arc in the direction orthogonal to the rolling direction. The processing accuracy of each rounded sample was evaluated using the two parameters H and θ illustrated in FIG. 3. If the parameters are within the range of 1.8 mm to 3.0 mm for H and 0° to 2.5° for θ, respectively, the sample is considered acceptable. The evaluation results are listed in Table 1. As seen from the table, it is clear that those steel sheets produced under the conditions within the scope of the present disclosure have good magnetic flux density and good processing accuracy of rounding.

TABLE 1

| No. | T1: maximum arrival temperature in the first cycle of cold rolling (° C.) | T2: maximum arrival temperature in the second cycle of cold rolling (° C.) | R1: total rolling reduction in the first cycle of cold rolling (%) | R2: total rolling reduction in the second cycle of cold rolling (%) | H1: average heating rate from 50° C. to 1000° C. (° C./h) | H2: average heating rate from 1000° C. to 1150° C. (° C./h) | Magnetic flux density $B_8$ (T) | H (mm) | θ (°) | Remarks |
|---|---|---|---|---|---|---|---|---|---|---|
| 1 | 50 | 200 | 29.5 | 87.9 | 32 | 20 | 1.940 | 1.9 | 0.3 | Example |
| 2 | 125 | 300 | 22.4 | 83.5 | 25 | 15 | 1.935 | 2.3 | 0.5 | Example |
| 3 | 30 | 100 | 41.4 | 67.2 | 20 | 10 | 1.934 | 2.2 | 0.5 | Example |
| 4 | 5 | 150 | 29.5 | 87.9 | 30 | 20 | 1.927 | 2.4 | 0.8 | Example |
| 5 | −20 | 250 | 28.2 | 87.2 | 30 | 25 | 1.558 | 3.2 | 2.9 | Comparative example |
| 6 | 200 | 250 | 28.2 | 87.2 | 30 | 25 | 1.937 | 5.0 | 2.9 | Comparative example |
| 7 | 75 | 50 | 28.2 | 87.2 | 30 | 25 | 1.941 | 3.6 | 6.3 | Comparative example |
| 8 | 30 | 30 | 28.2 | 87.2 | 30 | 25 | 1.941 | 5.7 | 7.0 | Comparative example |
| 9 | 30 | 450 | 28.2 | 87.2 | 30 | 25 | 1.931 | 4.4 | 8.4 | Comparative example |
| 10 | 30 | 400 | 74.6 | 65.2 | 30 | 25 | 1.915 | 5.4 | 7.4 | Comparative example |
| 11 | 30 | 200 | 47.5 | 48.5 | 30 | 25 | 1.674 | 3.1 | 1.5 | Comparative example |
| 12 | 30 | 200 | 28.2 | 87.2 | 25 | 25 | 1.935 | 2.7 | 3.7 | Comparative example |
| 13 | 30 | 200 | 28.2 | 87.2 | 3 | 23 | 1.941 | 4.7 | 5.1 | Comparative example |
| 14 | 30 | 200 | 28.2 | 87.2 | 45 | 30 | 1.933 | 4.3 | 6.0 | Comparative example |

Underlined if outside the scope of the disclosure.

Example 2

Steel slab with a chemical composition consisting of the components listed in Table 2 with the balance being Fe and inevitable impurities were each reheated to a temperature of 1425 °C, and then subjected to hot rolling including four passes of rough rolling from 1270 °C and five passes of finishing rolling from 1050 °C, to thereby obtain hot-rolled sheets having a thickness of 2.4 mm. The coiling temperature was set at 615 °C. Then, the steel sheets were subjected to pickling to remove scale, followed by hot-rolled sheet annealing at 1035 °C for 20 seconds. The average cooling rate in the temperature range from 800 °C to 350 °C in the hot-rolled sheet annealing was set at 30 °C/s. Subsequently, the thickness was reduced to 1.6 mm by the first cycle of cold rolling (rolling reduction R1: 33.3%), where the maximum arrival temperature T1 in the rolling was set at 50 °C by controlling the coolant flow rate. In addition, intermediate annealing was performed at 1050 °C for 100 seconds, with the average cooling rate in the temperature range from 800 °C to 350 °C set at 40 °C/s. Subsequently, the thickness was reduced to 0.23 mm by the second cycle of cold rolling (rolling reduction R2: 85.6%). At this point, the maximum arrival temperature T2 in the rolling was set at 220 °C by controlling the rolling speed and coolant flow rate. T1, T2, R1, and R2 satisfy the formulas (1) to (4).

Then, each cold-rolled sheet was further subjected to decarburization annealing including the earlier and later stages; in the earlier stage at 820 °C for 120 seconds, with 55% $H_2$+45% $N_2$ and a dew point of 65 °C, and in the later stage at 840 °C for 30 seconds, with 55% $H_2$+45% $N_2$ and a dew point of 15 °C. Subsequently, an annealing separator containing 85 mass % or more of MgO was applied to the steel sheet surface, and then each steel sheet was subjected to final annealing in which it was held at 1200 °C for 12 hours. The atmosphere during the final annealing was an $N_2$ atmosphere up to 900 °C during heating, an $H_2$ atmosphere during the period from the temperature rise from 900 °C to 1200 °C until the end of holding at 1200 °C, and an Ar atmosphere during the subsequent cooling. During the heating process in the final annealing, the average heating rate H1 in the temperature range from 50 °C to 1000 °C was set at 28 °C/h, the average heating rate in the temperature range from 1000 °C to 1150 °C was set at 18 °C/h, and the average hating rate in the temperature range from 1150 °C to 1200 °C was set at 8 °C/h. H1 and H2 satisfy the formulas (5) and (6).

The magnetic flux density $B_8$ of each grain-oriented electrical steel sheet thus obtained was evaluated in accordance with JIS C2550-1 (2011). The results are listed in Table 2. A magnetic flux density of 1.900 T or higher was considered to have excellent magnetic properties.

A 60-mm-square-sample was cut from each obtained steel sheet and rounded using a twin roller processing machine having an iron roller of 20 mm in diameter and a urethane roll of 300 mm in diameter. The direction of rounding was orthogonal to the rolling direction (i.e., the sheet transverse direction). In other words, each sample was rounded to form a circular arc in the direction orthogonal to the rolling direction. The processing accuracy of each rounded sample was evaluated using the two parameters H and θ illustrated in FIG. 3. If the parameters are within the range of 1.8 mm to 3.0 mm for H and 0° to 2.5° for θ, respectively, the sample is considered acceptable. The evaluation results are listed in Table 2. As seen from the table, it is clear that those steel sheets produced under the conditions within the scope of the present disclosure have good magnetic flux density and good processing accuracy of rounding.

TABLE 2

| No. | C (mass %) | Si (mass %) | Mn (mass %) | S (mass %) | Se (mass %) | Al (mass %) | N (mass %) | Other components (mass %) | Magnetic flux density $B_8$ (T) | H (mm) | θ (°) | Remarks |
|---|---|---|---|---|---|---|---|---|---|---|---|---|
| 15 | 0.025 | 3.37 | 0.10 | — | 0.025 | 0.033 | 0.0113 | — | 1.930 | 1.8 | 0.9 | Example |
| 16 | 0.062 | 3.38 | 0.06 | 0.024 | — | 0.013 | 0.0039 | — | 1.930 | 2.6 | 1.4 | Example |
| 17 | 0.085 | 3.44 | 0.06 | 0.007 | 0.024 | 0.017 | 0.0083 | — | 1.934 | 2.3 | 1.8 | Example |
| 18 | 0.003 | 3.36 | 0.05 | 0.003 | 0.015 | 0.022 | 0.0060 | — | 1.884 | 6.8 | 4.0 | Comparative example |
| 19 | 0.150 | 3.52 | 0.11 | 0.004 | 0.017 | 0.027 | 0.0072 | — | 1.550 | 2.6 | 0.2 | Comparative example |
| 20 | 0.057 | 1.65 | 0.11 | 0.005 | 0.027 | 0.022 | 0.0080 | — | 1.758 | 4.2 | 2.4 | Comparative example |
| 21 | 0.068 | 5.19 | 0.07 | 0.005 | 0.026 | 0.021 | 0.0037 | — | 1.547 | 2.9 | 1.4 | Comparative example |
| 22 | 0.062 | 3.39 | 0.005 | 0.005 | 0.019 | 0.021 | 0.0099 | — | 1.584 | 2.6 | 0.7 | Comparative example |
| 23 | 0.059 | 3.22 | 0.63 | 0.005 | 0.026 | 0.033 | 0.0066 | — | 1.524 | 2.0 | 1.7 | Comparative example |
| 24 | 0.051 | 3.26 | 0.10 | 0.002 | 0.002 | 0.030 | 0.0065 | — | 1.582 | 2.5 | 0.3 | Comparative example |
| 25 | 0.052 | 3.48 | 0.11 | 0.076 | 0.066 | 0.018 | 0.0038 | — | 1.675 | 3.7 | 1.8 | Comparative example |
| 26 | 0.073 | 3.81 | 0.05 | 0.005 | 0.013 | 0.007 | 0.0035 | — | 1.854 | 4.9 | 5.2 | Comparative example |
| 27 | 0.061 | 3.23 | 0.29 | 0.005 | 0.027 | 0.050 | 0.0049 | — | 1.552 | 2.8 | 3.2 | Comparative example |
| 28 | 0.055 | 3.44 | 0.28 | 0.012 | 0.015 | 0.018 | 0.0015 | — | 1.566 | 2.3 | 1.7 | Comparative example |
| 29 | 0.037 | 2.89 | 0.12 | 0.007 | 0.008 | 0.029 | 0.0140 | — | 1.530 | 2.7 | 1.2 | Comparative example |
| 30 | 0.061 | 3.28 | 0.07 | 0.003 | 0.023 | 0.023 | 0.0090 | Cr: 0.45, Sb: 0.04, Sn: 0.41, Zr: 0.02 | 1.947 | 2.6 | 1.8 | Example |
| 31 | 0.067 | 3.40 | 0.11 | — | 0.018 | 0.024 | 0.0105 | Ni: 1.33, B: 24 ppm, Bi: 0.02 | 1.943 | 1.8 | 1.6 | Example |
| 32 | 0.057 | 3.41 | 0.05 | 0.007 | — | 0.022 | 0.0083 | Nb: 0.015, V: 0.003, Cu: 0.36, Cr: 0.06 | 1.936 | 2.8 | 1.6 | Example |
| 33 | 0.069 | 3.40 | 0.06 | 0.005 | 0.026 | 0.023 | 0.0053 | Sb: 0.36, B: 4 ppm, P: 0.24, Mo: 0.06 | 1.942 | 2.8 | 0.8 | Example |
| 34 | 0.064 | 3.46 | 0.11 | 0.002 | 0.025 | 0.033 | 0.0068 | Ni: 0.04, Bi: 0.07, Nb: 0.003 | 1.947 | 2.1 | 1.0 | Example |
| 35 | 0.051 | 3.49 | 0.10 | 0.006 | 0.008 | 0.017 | 0.0109 | Zr: 0.07, Sn: 0.08, Cu: 0.07 | 1.940 | 2.2 | 1.2 | Example |
| 36 | 0.062 | 3.33 | 0.07 | 0.005 | 0.011 | 0.029 | 0.0085 | Mo: 0.34, P: 0.03, V: 0.008 | 1.945 | 2.6 | 1.3 | Example |
| 37 | 0.039 | 3.22 | 0.09 | 0.009 | 0.021 | 0.011 | 0.0043 | Co: 0.005 | 1.934 | 1.9 | 0.3 | Example |
| 38 | 0.056 | 3.36 | 0.10 | 0.021 | 0.010 | 0.024 | 0.0080 | Co: 0.003, Pb: 0.0060 | 1.931 | 2.5 | 0.3 | Example |
| 39 | 0.075 | 3.52 | 0.06 | 0.005 | 0.017 | 0.015 | 0.0044 | Co: 0.040, Pb: 0.0003 | 1.932 | 2.5 | 0.2 | Example |
| 40 | 0.034 | 3.21 | 0.08 | — | 0.017 | 0.023 | 0.0048 | Zn: 0.011, W: 0.0020, Ge: 0.0003 | 1.946 | 2.1 | 0.1 | Example |
| 41 | 0.075 | 3.67 | 0.13 | 0.020 | — | 0.014 | 0.0071 | Ga: 0.0040, Ge: 0.0040, As: 0.0020 | 1.948 | 2.7 | 0.1 | Example |
| 42 | 0.081 | 2.96 | 0.13 | 0.020 | 0.022 | 0.031 | 0.0064 | As: 0.0120, Zn: 0.002, W: 0.0080 | 1.943 | 2.6 | 0.4 | Example |
| 43 | 0.046 | 3.48 | 0.09 | 0.023 | 0.021 | 0.012 | 0.0042 | Zn: 0.004, Mo: 0.015 | 1.949 | 2.5 | 0.1 | Example |
| 44 | 0.025 | 3.63 | 0.07 | 0.006 | 0.016 | 0.012 | 0.0078 | Sb: 0.07, Co: 0.012, W: 0.0050 | 1.946 | 2.0 | 0.5 | Example |

Underlined if outside the scope of the disclosure.

The invention claimed is:

1. A method of producing a grain-oriented electrical steel sheet, the method comprising:
   - heating a steel material to a temperature of 1300 °C or higher, the steel material having a chemical composition containing, by mass %,
   - C: 0.010% or more and 0.100% or less,
   - Si: 2.00% or more and 5.00% or less,
   - Mn: 0.01% or more and 0.50% or less,
   - Al: 0.010% or more and 0.040% or less,
   - N: 0.0030% or more and 0.0120% or less, and
   - one or both of S and Se: 0.005% or more and 0.100% or less in total, with the balance being Fe and inevitable impurities;
   - then subjecting the heated steel material to hot rolling including at least one pass of rough rolling at 1100 °C or higher and 1300 °C or lower, followed by at least two passes of finishing rolling at 800 °C or higher and 1100 °C or lower, and coiling to obtain a hot-rolled sheet;
   - then subjecting the hot-rolled sheet directly, or after subjection to hot-rolled sheet annealing, to at least two cycles of cold rolling with intermediate annealing in between to obtain a cold-rolled sheet;
   - then subjecting the cold-rolled sheet to decarburization annealing to obtain a decarburization-annealed sheet;

then applying an annealing separator to a surface of the decarburization-annealed sheet; and then subjecting the decarburization-annealed sheet to final annealing to obtain a grain-oriented electrical steel sheet, wherein a maximum arrival temperature (°C) in the first cycle of the cold rolling, denoted by T1, and a maximum arrival temperature (°C) in the second cycle of the cold rolling, denoted by T2, satisfy the following formulas (1) to (3), a total rolling reduction (%) in the first cycle of the cold rolling, denoted by R1, and a total rolling reduction (%) in the second cycle of the cold rolling, denoted by R2, satisfy the following formula (4), and in the final annealing, an average heating rate (°C/h) in a temperature range from 50 °C to 1000 °C, denoted by H1, and an average heating rate (°C/h) in a temperature range from 1000 °C to (maximum arrival temperature−50 °C), denoted by H2, satisfy the following formulas (5) and (6):

$$0 \leq T1 \leq 150 \quad (1)$$

$$50 \leq T2 \leq 400 \quad (2)$$

$$T1 \leq T2 \quad (3)$$

$$R2 \geq 50 \geq R1 \quad (4)$$

$$H1 \geq 1.1 \times H2 \quad (5)$$

$$5 \leq H1 \leq 40. \quad (6)$$

2. The method of producing a grain-oriented electrical steel sheet according to claim 1, wherein the coiling is carried out at a coiling temperature of 400 °C or higher and 750 °C or lower, the hot-rolled sheet annealing includes holding the hot-rolled sheet at 800 °C or higher and 1250 °C or lower for at least 5 seconds, and then cooling the hot-rolled sheet at an average cooling rate of 5 °C/s or higher and 100 °C/s or lower in a temperature range from 800 °C to 350 °C, the intermediate annealing includes holding an intermediate sheet after subjection to the first cycle of the cold rolling at 800 °C or higher and 1250 °C or lower for at least 5 seconds, and then cooling the intermediate sheet at an average cooling rate of 5 °C/s or higher and 50 °C/s or lower in a temperature range from 800 °C to 350 °C, the decarburization annealing includes holding the cold-rolled sheet at 750 °C to 950 °C for at least 10 seconds in an atmosphere that contains $H_2$ and $N_2$ and that is in a wet atmosphere with a dew point of 20 °C or higher and 80 °C or lower at least partially during the decarburization annealing, wherein the annealing separator contains MgO, before the final annealing, the annealing separator, which contains MgO, is applied to the surface of the decarburization-annealed sheet at a weight of at least 2.5 g/$m^2$ per surface, and the final annealing includes holding the decarburization-annealed sheet at 1050 °C or higher and 1300 °C or lower for at least 3 hours under conditions where an atmosphere in at least part of a temperature range of 1050 °C or higher contains $H_2$.

3. The method of producing a grain-oriented electrical steel sheet according to claim 2, wherein the chemical composition further contains, by mass % or mass ppm, at least one selected from the group consisting of Ni: 0% or more and 1.50% or less,
Cr: 0% or more and 0.50% or less,
Cu: 0% or more and 0.50% or less,
P: 0% or more and 0.50% or less,
Sb: 0% or more and 0.50% or less,
Sn: 0% or more and 0.50% or less,
Bi: 0% or more and 0.50% or less,
Mo: 0% or more and 0.50% or less,
B: 0 ppm or more and 25 ppm or less,
Nb: 0% or more and 0.020% or less,
V: 0% or more and 0.010% or less, and
Zr: 0% or more and 0.10% or less.

4. The method of producing a grain-oriented electrical steel sheet according to claim 3, wherein the chemical composition further contains, by mass %, one or both of Co: 0% or more and 0.050% or less and Pb: 0% or more and 0.0100% or less.

5. The method of producing a grain-oriented electrical steel sheet according to claim 4, wherein the chemical composition further contains, by mass %, at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less.

6. The method of producing a grain-oriented electrical steel sheet according to claim 3, wherein the chemical composition further contains, by mass %, at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less.

7. The method of producing a grain-oriented electrical steel sheet according to claim 2, wherein the chemical composition further contains, by mass %, one or both of Co: 0% or more and 0.050% or less and Pb: 0% or more and 0.0100% or less.

8. The method of producing a grain-oriented electrical steel sheet according to claim 7, wherein the chemical composition further contains, by mass %, at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less.

9. The method of producing a grain-oriented electrical steel sheet according to claim 2, wherein the chemical composition further contains, by mass %, at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less.

10. The method of producing a grain-oriented electrical steel sheet according to claim 1, wherein the chemical composition further contains, by mass % or mass ppm, at least one selected from the group consisting of Ni: 0% or more and 1.50% or less,
Cr: 0% or more and 0.50% or less,
Cu: 0% or more and 0.50% or less,
P: 0% or more and 0.50% or less,
Sb: 0% or more and 0.50% or less,
Sn: 0% or more and 0.50% or less,
Bi: 0% or more and 0.50% or less,
Mo: 0% or more and 0.50% or less, B: 0 ppm or more and 25 ppm or less, Nb: 0% or more and 0.020% or less, V: 0% or more and 0.010% or less, and Zr: 0% or more and 0.10% or less.

11. The method of producing a grain-oriented electrical steel sheet according to claim 10, wherein the chemical composition further contains, by mass %, one or both of Co: 0% or more and 0.050% or less and Pb: 0% or more and 0.0100% or less.

12. The method of producing a grain-oriented electrical steel sheet according to claim 11, wherein the chemical composition further contains, by mass %, at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less.

13. The method of producing a grain-oriented electrical steel sheet according to claim 10, wherein the chemical composition further contains, by mass %, at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less.

14. The method of producing a grain-oriented electrical steel sheet according to claim 1, wherein the chemical composition further contains, by mass %, one or both of Co: 0% or more and 0.050% or less and Pb: 0% or more and 0.0100% or less.

15. The method of producing a grain-oriented electrical steel sheet according to claim 14, wherein the chemical composition further contains, by mass %, at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less.

16. The method of producing a grain-oriented electrical steel sheet according to claim 1, wherein the chemical composition further contains, by mass %, at least one selected from the group consisting of As: 0% or more and 0.0200% or less, Zn: 0% or more and 0.020% or less, W: 0% or more and 0.0100% or less, Ge: 0% or more and 0.0050% or less, and Ga: 0% or more and 0.0050% or less.

* * * * *